3,660,436
Patented May 2, 1972

3,660,436

SULFAMOYLARYL UREAS

Otto Scherer, Bad Soden, Taunus, and Gerhard Horlein, Frankfurt am Main, Germany, assignors to Farbwerke Hoechst Aktiengesellschaft vormals Meister Lucius & Bruning, Frankfurt am Main, Germany No Drawing. Continuation-in-part of application Ser. No. 651,709, July 7, 1967. This application June 9, 1970, Ser. No. 44,856
Claims priority, application Germany, July 7, 1967, F 49,708, F 49,709
Int. Cl. C07c *143/80;* C07d *29/34, 87/46*
U.S. Cl. 260—397.7 7 Claims

ABSTRACT OF THE DISCLOSURE

Compounds having desirable selective herbicidal activity are sulfamoyl ureas of the formula

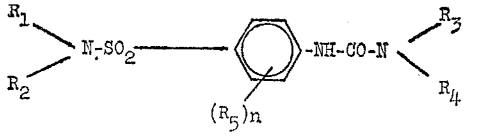

in which $R_1$ is alkyl of 1 to 4 carbon atoms;
$R_2$ is alkyl of 1 to 4 carbon atoms or methoxy; or
$R_1$ and $R_2$ together with the nitrogen on which they are substituted are pyrrolidino, piperadino or morpholino;
$R_3$ is methyl or ethyl;
$R_4$ is methyl, ethyl or methoxy;
$R_5$ is methyl, chloro, bromo or dichloro-difluoro-ethoxy; and
$n$ is 0, 1 or 2, $n$ being at least 1 when $R_1$, $R_2$, $R_3$ and $R_4$ are all methyl.

This application is a continuation-in-part of application Ser. No. 651,709, filed July 7, 1967.

The present invention relates to novel sulfamoylaryl ureas of the general formula

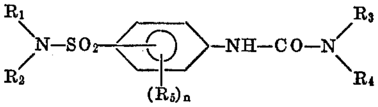

in which $R_1$ stands for an alkyl radical with 1 to 4 carbon atoms preferably methyl or ethyl; $R_2$ is an alkyl radical having 1 to 4 carbon atoms, preferably methyl, ethyl, or the methoxy radical; or $R_1$ and $R_2$ together with the nitrogen on which they are substituted represent pyrrolidino, piperidino or morpholino; $R_3$ is methyl or ethyl, preferably methyl; $R_4$ is methyl, ethyl or methoxy, preferably methyl or methoxy; $R_5$ is methyl, chloro, bromo or dichloro-difluoro-ethoxy, preferably methyl, chloro, or bromo and $n$ is 0, 1 or 2, preferably 0 or 1, $n$ being at least 1, when $R_1$, $R_2$, $R_3$ and $R_4$ are all methyl.

The novel compounds have a good herbicidal action and are well tolerated by crop plants. They can be used, for example, for potatoes which have already emerged, without damaging the latter but while having a good herbicidal action, whereas the known urea derivatives can be used only before the emergence of potatoes since otherwise the latter would be much damaged.

The compounds in accordance with the invention are obtained by (A) Reacting N-aryl-N′-alkyl or N-aryl-N′-alkoxy ureas or N-aryl-N′, N′-dialkyl or N-aryl-N′,N′-alkyl-alkoxy ureas with chlorosulfonic acid and then reacting the product so obtained with primary or secondary amines; or (B) Reacting N-mono- or N,N-disubstituted sulfamoylaryl isocyanates with alkylamines or dialkylamines or with O-alkyl or O,N-dialkylhydroxylamines; or (C) Reacting N-mono- or N,N-disubstituted sulfamoylaryl isocyanates with O-alkylhydroxylamines and alkylating the product so obtained; or (D) Reacting N-mono- or N,N-disubstituted sulfamoylaryl isocyanates with N-alkylhydroxylamines and alkylating the product so obtained; or (E) Reacting N-mono- or N,N-disubstituted sulfamoylaryl isocyanates with hydroxylamine and dialkylating the product so obtained; or (F) Reacting N-mono- or N,N-disubstituted sulfamoylarylamines with alkyl isocyanates or dialkylcarbamic acid chlorides; or (G) Reacting N-mono- or -N,N-disubstituted sulfamoylaryl carbamic acid halides with alkyl- or dialkylamines or with O-alkyl or O,N-dialkylhydroxylamines.

The present invention also relates to herbicidal preparations containing any of the above novel compounds as a herbicidal active substance either alone or in admixture with, for example, other biocidal substances, fertilizers, liquid or solid inert materials; surface-active substances, adhesives, dispersing agents, grinding auxiliary agents or emulsifiers.

The course of the reaction for making the novel compounds may be illustrated by the following reaction schemes, in which radicals $R_1$ to $R_4$ have the meanings given above:

(A)

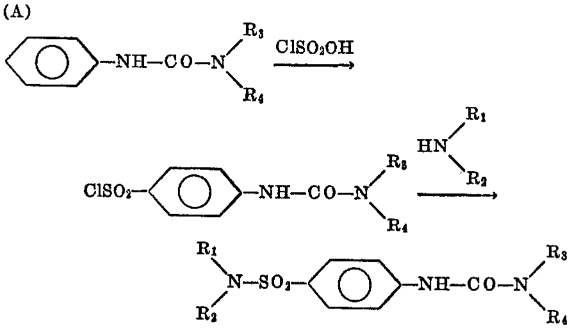

(B)

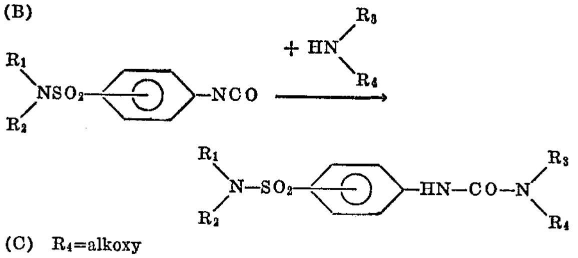

(C) $R_4$=alkoxy

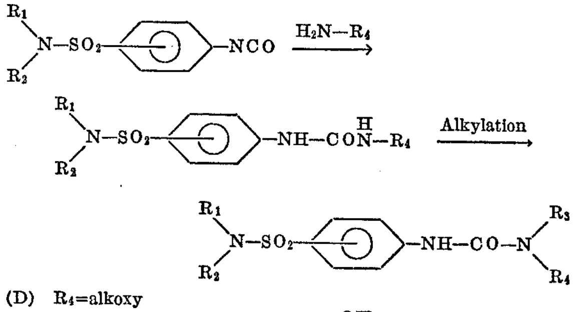

(D) $R_4$=alkoxy

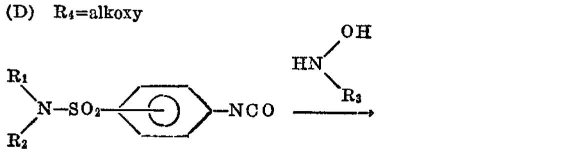

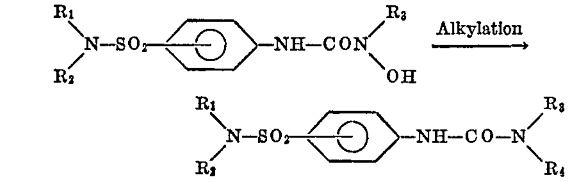

(E) $R_4$=alkoxy

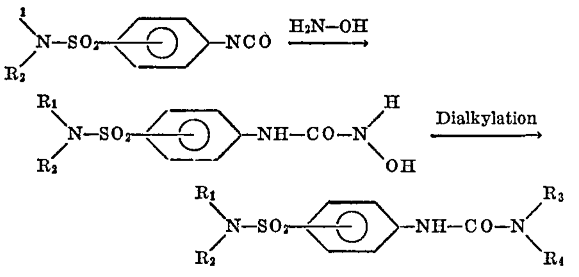

(F) $R_3$=hydrogen, $R_4$—alkyl

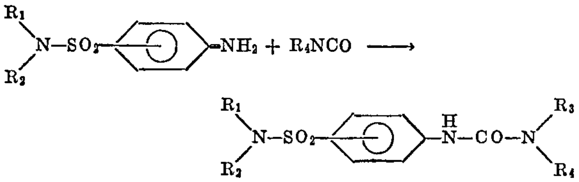

$R_3$ and $R_4$=alkyl

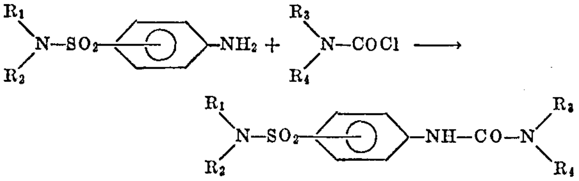

(G)

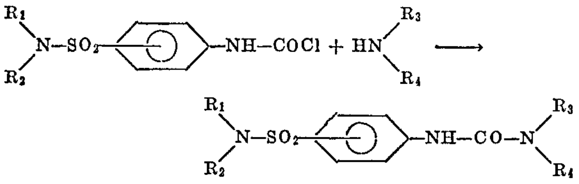

According to the above schemes the following compounds may, for example, be obtained in the indicated manner:

(A)

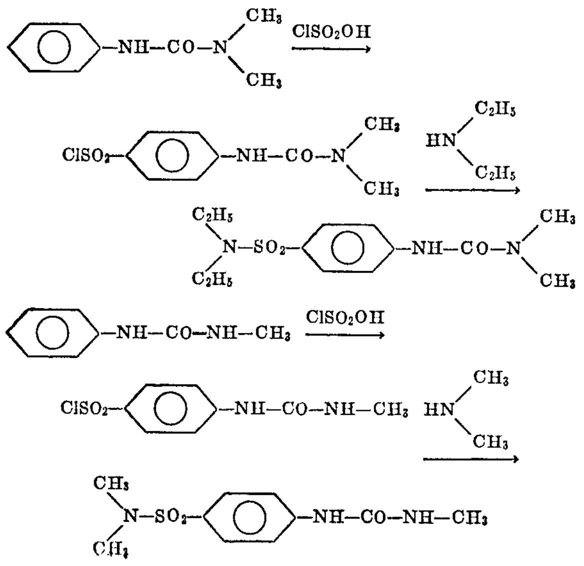

(B)

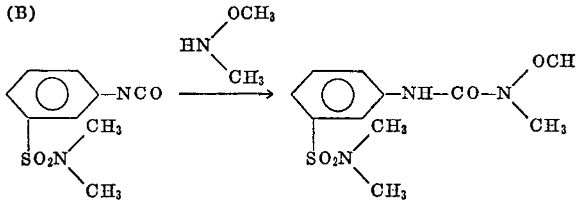

(C)

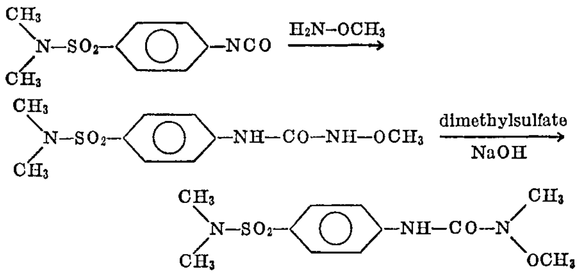

(F)

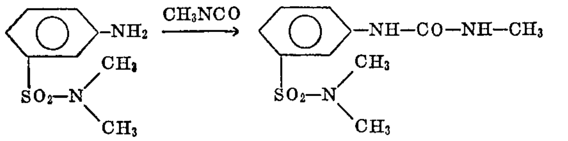

The chlorosulfonation of aryl ureas may be carried out with the mono-alkyl- or dialkyl- or the mono-alkoxy- or alkyl-alkoxy-substituted compounds. The reaction is carried out at low temperature, advantageously at 5 to 30° C., and preferably in an excess amount of chlorosulfonic acid. The sulfochlorides are then reacted, without further purification and drying, with the corresponding amines in an aqueous or aqueous-organic phase.

The reaction of the N-mono- or N,N-disubstituted sulfamoyl aryl isocyanates or carbamic acid chlorides with the amines or alkylated hydroxylamine is advantageously carried out at a temperature below 80° C. in the presence or absence of a diluent. Examples of suitable diluents are benzene, toluene, dioxane and dimethyl formamide.

The reaction of the N-mono- or N,N-disubstituted sulfamoyl aryl isocyanates with hydroxylamine is advantageously carried out at a temperature below 40° C. in a two-phase mixture of water and an organic solvent immiscible with water.

The alkylations are advantageously carried out in an aqueous alkaline suspension or in mixtures of aqueous alkali and an organic solvent. The alkali liquor and the alkylating agent are advantageously added simultaneously while controlling the pH value. It is also possible, however, to place the urea together with the alkylating agent in an organic solvent in the reaction vessel and then to add the alkali liquor or to proceed in a converse manner if the compounds are less sensitive to alkali. The reaction temperature used depends on the reactivity of the alkylating agent and is within the range of 10 to 90° C.

The novel N-mono- or N,N-disubstituted sulfamoylaryl isocyanates serving as starting materials for processes B to E described above are obtainable by a known phosgenation of the corresponding amines or their hydrochlorides.

The alkylation in processes C, D, and E carried out with the use of dialkyl sulfates, alkyl halides and alkyl toluene sulfonates.

The novel products of the above formula are obtained in good yields and in most cases constitute crystalline compounds. They can generally be used in the form they are obtained but may be further purified by recrystallization from the usual solvents.

The products in accordance with the invention may be used in the form of dusting powders, granules, wettable powders, solutions or emulsion concentrates for controlling undesirable plants.

For the manufacture of dusting powders there may be used as solid carriers talcum, kaolin, bentonite, pyrophillite or diatomaceous earth.

As carriers for granules sand, kaolinites or granular fertilizers may be used.

The wettable powders are made by grinding with inert materials used for dusting powders, while adding wetting or dispersing agents or adhesives.

Atomizable solutions and emulsion concentrates are obtained by dissolving the active substance in an organic solvent, for example, mineral oils, Diesel oils, alkylated naphthalenes, xylene mixtures, cyclohexanols, ketones or chlorinated hydrocarbons. When chlorinated hydrocarbons are used, emulsifiers are added.

filtered, washed with water until free from chlorine ions and dried at 80° C.

Yield after recrystallization from methanol 82 g.; melting point 140–141° C.

Analysis:

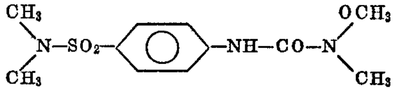

Calc.: 14.62% N; 11.1% S
Found: 14.82% N; 12.2% S
$C_{11}H_{17}N_3O_4S$; molecular weight 287

EXAMPLES 2–8

The following compounds were obtained according to Example 1 while using, instead of methylamine, the amines indicated in the following table.

TABLE

| Example | Amine | Product | Solvent for recrystallization | Melting point (° C.) | Analysis, percent: Calculated N | Calculated S | Found N | Found S |
|---|---|---|---|---|---|---|---|---|
| 2 | 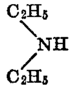 | 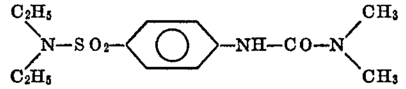 | Methanol | 102–103 | 14.0 | 10.7 | 13.5 | 10.7 |
| 3 | 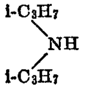 | 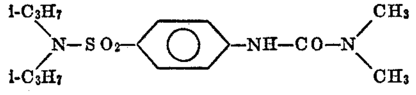 | Benzene | 163–164 | 12.8 | 9.8 | 12.5 | 10.0 |
| 4 | 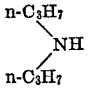 | 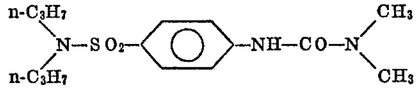 | Methanol | 115–117 | 12.8 | 9.8 | 12.6 | 9.7 |
| 5 | 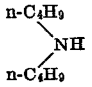 | 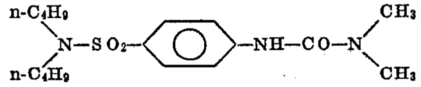 | do | 123–124 | 11.8 | 9.0 | 11.6 | 9.2 |
| 6 | 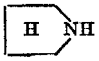 | 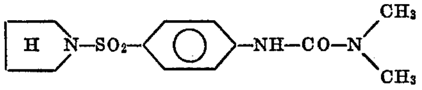 | do | 164–166 | 13.5 | 10.8 | 14.0 | 10.9 |
| 7 |  | 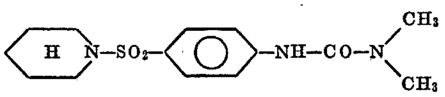 | do | 172–175 | 13.5 | 10.2 | 13.3 | 10. |
| 8 | 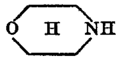 | 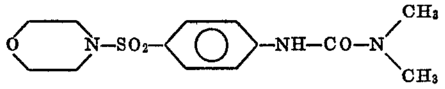 | Large amount of methanol. | 203–204 | 13.4 | 10.2 | 13.2 | 10.2 |

The herbicides may contain as the herbicidal active substance, for example, any of the compounds described in Examples 1 to 23.

The following examples serve to illustrate the invention but are not intended to limit, the parts being by weight.

EXAMPLE 1

At a temperature of 12 to 15° C., 0.5 mole=90 g. N-phenyl-N'-methoxy, N'-methyl urea were introduced, while stirring, into 290 g. chlorosulfonic acid and the mixture was heated for 2 hours at 60° C. After cooling, the reaction mixture was poured into a mixture of ice and water, the N-(4-chlorosulfonylphenyl)-N'-methoxy, N'-methyl urea which had precipitated was suction-filtered and washed twice with water. After having been suction-filtered, the crude product was introduced at room temperature, without further drying, into 200 cc. of a 40% aqueous solution of dimethylamine. For an after-reaction, the whole was heated for 30 minutes to 60° C. After cooling the reaction mixture was poured into a mixture of ice and water and the precipitate thus obtained was suction

EXAMPLE 9

In a manner analogous to that of Example 1, 290 g. chlorosulfonic acid and 0.5 mole=82 g. N-phenyl-N'-N'-di-methyl urea were reacted to obtain N-(4-chlorosulfonyl-phenyl)-N'-N'-di-methyl urea which was then reacted as a crude product with a solution of 1.5 moles=90 g. O,N-dimethylhydroxylamine in 250 ml. drizon and worked up as described in Example 1.

Yield after recrystallization from methanol 70 g.; melting point 159–161° C.

*Analysis:*

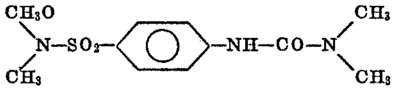

$C_{11}H_{17}N_3O_4S$; molecular weight 287

Calculated: 14.6% N; 11.1% S.
Found: 14.2% N; 11.2 S.

EXAMPLE 10

In a manner analogous to that of Example 1, 290 g. chlorosulfonic acid and 0.5 mole=90 g. N-phenyl-N'-methoxy-N'-methyl urea were reacted to obtain N-(4-chlorosulfonylphenyl)-N'-methoxy-N'-methyl urea which, after suction-filtration, was introduced as a crude product, without further drying, at room temperature, while stirring, into a solution of 1.5 mole (110 g.) diethylamine in 250 cc. dioxane.

For an after-reaction, the reaction mixture was heated for 30 minutes to 60° C. The mixture was then cooled and poured into an excess amount of water. The precipitated product was suction-filtered, washed with water until free from chlorine ions and dried at 50 to 60° C.

By recrystallization from methanol in one instance and formamide in another instance, 80 g. of pure product melting at 88 to 89° C. were obtained.

*Analysis:*

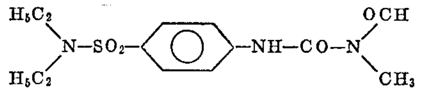

$C_{13}H_{21}N_3O_4S$; molecular weight 315

Calc.: 13.3% N; 10.2% S.
Found: 13.2% N; 10.0% S.

EXAMPLE 11

In a manner analogous to that described in Example 1, 290 g. chlorosulfonic acid and 0.5 mole=90 g. N-phenyl-N'-methoxy-N'-methyl uera were reacted to obtain N-(4 - chlorosulfonyl-phenyl)-N'-methoxy-N'-methyl urea which was introduced into a solution of 1.5 moles=90 g. O,N-dimethylhydroxylamine in 250 cc. dioxane. For an after-reaction the mixture was heated for 30 minutes to 60° C. The mixture was then cooled and poured into an excess amount of water. The precipitated product was suction-filtered, washed with water and dried.

Yield 120 g.; melting point 143–146° C.

Yield after recrystallization from ethanol 99 g.; melting point 148–150° C.

*Analysis:*

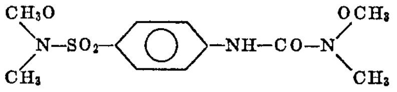

$C_{11}H_{17}N_3O_5S$; molecular weight 303

Calc.: 13.9% N; 10.6% S.
Found: 13.7% N; 10.5% S.

EXAMPLE 12

In a manner analogous to that of Example 1, 290 g. chlorosulfonic acid and 0.5 mole=90 g. N-phenyl-N'-methoxy-N'-methyl urea were reacted to obtain N-(4-chlorosulfonylphenyl)-N'-methoxy-N'-methyl urea which was introduced into a solution of 1.5 moles=110 g. diethylamine in 250 cc. water. For an after-reaction, the mixture was heated for 30 minutes to 60° C., the product was suction filtered, washed with water until free from chlorine ions and dried.

Yield after recrystallization from a small amount of methanol 152 g.; melting point 86 to 87° C.

*Analysis:*

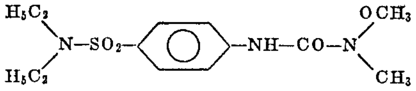

$C_{13}H_{21}N_3O_4S$; molecular weight 315

Calc.: 13.3% N; 10.2% S.
Found: 13.2% N; 10.0% S.

EXAMPLE 13

0.2 mole=45 g. 3-(dimethylsulfamoyl)-phenyl isocyanate were dissolved in 150 cc. absolute benzene and 1 cc.

triethylamine was added. A solution of 0.22 mole=14 g. O,N-dimethylhydroxylamine in 20 cc. absolute benzene was run in at 40° C. After the reaction, the solvent was distilled off and the residue recrystallized from iso-propanol. Yield 51 g.; melting point 114–117° C.

*Analysis:*

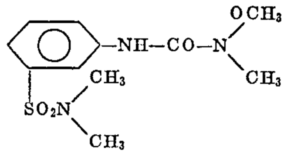

$C_{11}H_{17}N_3O_4S$; molecular weight 287

Calc.: 14.6% N; 11.1% S.
Found: 14.4% N; 11.4% S.

EXAMPLE 14

In a manner analogous to that described in Example 13, 0.2 mole=15 g. diethylamine were added dropwise to the aryl isocyanate instead of O,N-dimethylhydroxylamine. After the reaction had been terminated, the solvent was distilled off. The light yellow oil remaining behind solidified after some days and was then recrystallized from ethanol. Yield 30 g.; melting point 110 to 113° C.

*Analysis:*

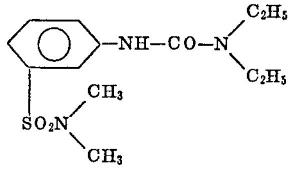

Calc.: 14.0% N; 10.7% S
Found: 13.7% N; 10.8% S
$C_{13}H_{21}N_3O_3S$; molecular weight 299

EXAMPLE 15

At a temperature of 12 to 15° C., 0.5 mole=89 g. N-(3 - methylphenyl) - N',N' - dimethyl urea were introduced into 290 g. chlorosulfonic acid, while stirring. The reaction mixture was then heated for 2 hours at 60° C. After cooling, the reaction mixture was introduced into a mixture of ice and water, and N-(3-methyl-4-chlorosulfonylphenyl) - N',N' - dimethyl urea which had precipitated was suction-filtered and washed twice with water. After suction filtration, the crude product was introduced, without further drying, at room temperature, into 170 cc. of a 40% aqueous solution of dimethylamine. The mixture was heated for 30 minutes to 60° C. for an after-reaction, and then cooled. The reaction product was suction-filtered, washed with water until free from chlorine ions and dried.

Yield after recrystallization from methanol 100 g.; melting point 156–158° C.

*Analysis:*

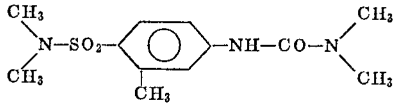

Calc.: 14.7% N; 11.2% S
Found: 14.5% N; 11.2% S
$C_{12}H_{19}N_3O_3S$; molecular weight 285

EXAMPLE 16

In a manner analogous to that of Example 15, 0.5 mole=89 g. N-(3-methyl-phenyl) - N',N' - dimethyl urea were reacted to N-(3-methyl - 4 - chlorosulfonylphenyl)-N',N'-dimethyl urea which was introduced into a solution of 1.5 moles=110 g. diethylamine in 100 cc. water. The mixture was heated for 30 minutes to 60° C. for an after-reaction and then cooled whereby the mixture was separated into two phases. The organic phase was taken up in methylene chloride, dried with $Na_2SO_4$ and the solvent was distilled off. The oil remaining behind was recrystallized from acetic ester. Yield 65 g.; melting point 88 to 90° C.

*Analysis:*

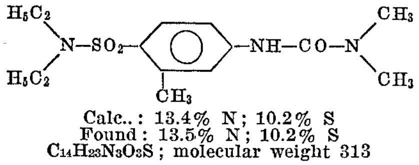

Calc..: 13.4% N; 10.2% S
Found: 13.5% N; 10.2% S
$C_{14}H_{23}N_3O_3S$; molecular weight 313

EXAMPLE 17

In a manner analogous to that of Example 15, 290 g. chlorosulfonic acid and 0.5 mole=89 g. N-(3-methylphenyl)-N',N'-dimethyl urea were reacted to obtain N-(3-methyl-4-chlorosulfonylphenyl)-N',N' - dimethyl urea. The latter was introduced into a solution of 1.5 moles=106 g. pyrrolidine in 130 cc. water. The reaction product was worked up as described in Example 1.

Yield after recrystallization from methanol 65 g.; melting point 148–150° C.

*Analysis:*

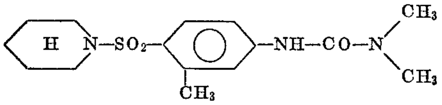

Calc.: 13.5% N; 10.3% S
Found: 13.7% N; 10.4% S
$C_{14}H_{21}N_2O_3S$; molecular weight 311

EXAMPLE 18

In a manner analogous to that of Example 15, 290 g. chlorosulfonic acid and 0.5 mole=96 g. N-(3,5-dimethylphenyl)-N',N'-dimethyl urea were reacted to N-(3,5-dimethyl-4-chlorosulfonylphenyl)-N',N'-dimethyl urea. The latter was further reacted as a crude product with 1.5 moles=170 cc. of a 40% aqueous solution of dimethylamine and worked up as described in Example 1.

Yield after recrystallization from acetic ester 50 g.; melting point 157 to 158° C.

*Analysis:*

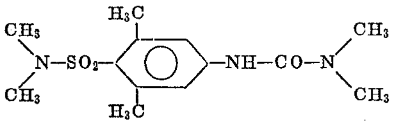

$C_{13}H_{21}N_3O_3S$; molecular weight 299
Calc.: 14.1% N; 10.7% S.
Found: 14.5% N; 11.0 % S.

EXAMPLE 19

In a manner analogous to that of Example 15, 290 g. chlorosulfonic acid and 0.5 mole=99 g. N-(3- chlorophenyl)-N',N'-dimethyl urea were reacted to N-(3-chloro - 4 - chlorosulfonylphenyl)-N',N'-dimethyl urea which was further reacted as a crude product with 1.5 moles =170 cc. of a 40% aqueous solution of dimethylamine and worked up as described in Example 1.

Yield after recrystallization from isopropanol 72 g.; melting point 142–143° C.

*Analysis:*

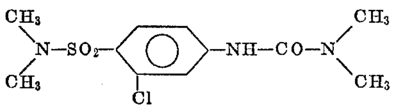

$C_{11}H_{16}ClN_3O_3S$; molecular weight 305.5
Calc.: 11.6% Cl; 13.7% N.
Found: 11.6% Cl; 13.6% N.

EXAMPLE 20

In a manner analogous to that of Example 15, 290 g. chlorosulfonic acid and 0.5 mole=122 g. N-(3-bromophenyl)-N',N'-dimethyl urea were reacted to N-(3-bromo-4-chlorosulfonylphenyl)-N',N'-dimethyl urea which was further reacted as a crude product with 1.5 moles=170 cc. of a 40% aqueous solution of dimethylamine and worked up as described in Example 1.

Yield after recrystallization from methanol 69 g.; melting point 154 to 156° C.

*Analysis:*

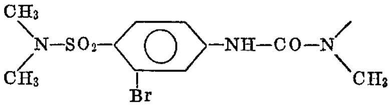

$C_{11}H_{16}BrN_3O_3S$; molecular weight 350
Calc.: 22.8% Br; 9.2% S.
Found: 22.6% Br; 9.2% S.

EXAMPLE 21

In a manner analogous to that of Example 15, 175 g. chlorosulfonic acid and 0.3 mole=94 g. N-[3-(2',2'-dichloro - 1',1' - difluoromethoxy) - phenyl]-N',N'-dimethyl urea were reacted to N-[3-(2',2'-dichloro-1',1'-difluorethoxy) - 4 - chlorosulfonylphenyl] - N',N'-dimethyl urea which was further reacted as a crude product with 100 g. of a 40% aqueous solution of dimethylamine and worked up as described in Example 1.

Yield after recrystallization from acetonitrile 45 g.; melting point 182–185° C.

*Analysis:*

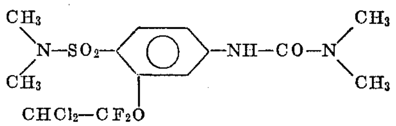

$C_{13}H_{17}Cl_2F_2N_3O_4S$; molecular weight 420
Calc.: 16.9% Cl; 10.0% N; 7.6% S.
Found: 16.1% Cl; 10.2% N; 7.9% S.

EXAMPLE 22

In a manner analogous to that of Example 15, 290 g. chlorosulfonic acid and 0.5 mole=97 g. N-(3-methylphenyl)-N'-methyl-N'-methoxy urea were reacted to N-(3-methyl - 4 - chlorosulfonylphenyl)-N'-methyl-N'-methoxy urea which was reacted as a crude product with 1.5 moles =170 cc. of a 40% aqueous solution of dimethylamine and worked up as described in Example 1.

Yield after recrystallization from methanol 70 g.; melting point 95 to 98° C.

*Analysis:*

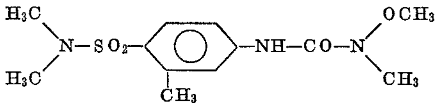

$C_{12}H_{19}N_3O_4S$; molecular weight 301
Calc.: 14.0% N; 10.6% S.
Found: 14.2% N; 10.9% S.

EXAMPLE 23

In a manner analogous to that of Example 15, 290 g. chlorosulfonic acid and 0.5 mole=97 g. N-(3-methylphenyl)-N'-methyl-N'-methoxy urea were reacted to N-(3-methyl - 4 - chlorosulfonylphenyl)-N'-methyl-N'-methoxy urea which was introduced as a crude product into a solution of 0.75 mole=46 g. O,N-dimethylhydroxylamine and 0.75 mole=75 g. triethylamine in 400 cc. dioxane. The mixture was further reacted by heating for 30 minutes to 60° C., and then cooled and an excess amount of water was added. The precipitated honey-like residue was taken up in methylene chloride, dried with $Na_2SO_4$ and the methylene chloride was distilled off.

55 g. of a thick oil which could not be distilled were obtained.

*Analysis:*

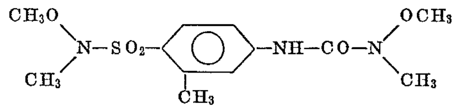

$C_{12}H_{19}N_3O_5S$; molecular weight 317
Calc.: 13.3% N; 10.1% S.
Found: 13.3%N; 10.2% S.

EXAMPLE 2

A wettable powder dispersable in water was obtained by thoroughly mixing 25 parts N-[4-(dimethylsulfamoyl)-phenyl]-N'-methyl-N'-methoxy urea of the following formula

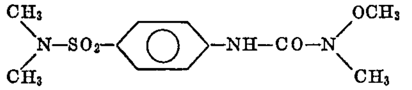

| | Parts |
|---|---|
| Silicic acid containing kaolin | 64 |
| Cellulose pitch | 10 |
| Sodium oleyl methyl tauride | 1 |

In analogous manner, the other active substances of the invention could be formulated to wettable powders.

EXAMPLE 25

Cotton plants 5 weeks old, which had already developed the first two leaves were treated in a greenhouse with a wettable powder formulation of preparation I suspended in water. At the same time, plants of wild mustard, wild oat, chickweed and wild camomile 2 to 4 weeks old were treated with the same suspension. As a comparison preparation the known urea herbicide II was used. The formulation additives corresponded to Example 24.

The tests were evaluated 4 weeks after the treatment. The test results are indicated in the following table.

TABLE

| Test plant | | Damage in percent with kg. active substance per ha. | | | |
|---|---|---|---|---|---|
| | | 5.0 | 2.5 | 1.2 | 0.3 |
| Preparation: | | | | | |
| I | Cotton | 15 | 10 | 0 | 0 |
| II | Cotton | 100 | 100 | 100 | 90 |
| I | Wild mustard | 100 | 100 | 85 | 55 |
| II | Wild mustard | 100 | 100 | 100 | 90 |
| I | Wild oat | 75 | 60 | 40 | 30 |
| II | Wild oat | 100 | 95 | 80 | 50 |
| I | Chick weed | 100 | 100 | 90 | 60 |
| II | Chick weed | 100 | 100 | 100 | 80 |
| I | Wild camomile | 80 | 75 | 50 | 20 |
| II | Wild camomile | 95 | 90 | 70 | 20 |

Contrary to comparison substance II which had a somewhat stronger herbicidal action but simultaneously killed the cotton, substance I of the invention, used in a concentration of 2.5 kg./ha., spared the cotton completely or almost completely, destroyed the dicotyledonous weeds wild mustard and chickweed and considerably damaged the wild camomile and the monocotyledonous weed wild oat.

The compound in accordance with the invention therefore permits a herbicidal treatment of emerged young cotton plants.

Preparation I=N-(4-dimethylsulfamoylphenyl)-N'-methyl-N'-methoxy urea

Preparation II=N - (3,4-dichlorophenyl)-N'-methyl-N'-methoxy urea (linuron)

EXAMPLE 26

Maize and the weeds barnyard grass, wild mustard and a number of further annual dicotyledonous weeds such as fat hen, chickweed and wild camomile were sown in a greenhouse in boxes containing a mixture of loamy soil, sand and compost. On the day of sowing, preparation I in the form of a wettable powder formulation suspended in water in accordance with or analogous to Example 1 were sprayed on the surface of the soil.

As a comparison preparation the known urea herbicide II was used.

The test was evaluated 5 weeks after the treatment. The test results are indicated in the following table. Of the dicotyledonous weeds, only wild mustard has been named in the table, since the herbicidal action of all preparations on the other weeds was within the same range as that on wild mustard.

TABLE

| Test plant | | Damage in percent with kg. active substance per ha. | | |
|---|---|---|---|---|
| | | 5.0 | 2.5 | 1.2 |
| Preparation: | | | | |
| I | Maize | 20 | 0 | 0 |
| II | Maize | 30 | 25 | 0 |
| I | Barnyard grass | 90 | 60 | 30 |
| II | Barnyard grass | 30 | 15 | 10 |
| I | Wild mustard | 100 | 100 | 70 |
| II | Wild mustard | 100 | 100 | 80 |

The action of the compound of the invention on dicotyledonous weeds such as wild mustard was approximately equal to that of the comparison substance. With the applied amounts of active substance, with which annual dicotyledonous weeds are easy to control, the maize was spared or relatively little damaged by all the preparations used. Contrary thereto, barnyard grass, a weed which is frequently found in the fields and which is difficult to control was strongly damaged by the compound in accordance with the invention or even destroyed when larger amounts of preparation were used, while the comparison preparation spared the barnyard grass nearly as well as the cultivated plant maize. The boxes in which the barnyard grass had been sown were allowed to stand 10 weeks beyond the normal end of the test. After that time, almost all plants that had not been treated or had been treated with the comparison preparation were found to have formed infructescences and seeds whereas the plants that had survived a treatment with 2.5 to 10.0 kg./ha. of the compounds of the invention were so strongly damaged that only here and there seeds had been formed.

A treatment with the products in accordance with the invention therefore enabled a satisfactory control of the annoying barnyard grass in maize even when the said weed was not destroyed completely.

Preparation I=N - (diethylsulfamoylphenyl) - N',N'-dimethyl urea

Preparation II=N-4-chlorophenyl-N'-methyl-N'-isobutinyl urea (butyron).

EXAMPLE 27

The weeds

| | |
|---|---|
| Wild mustard | *Sinapis arvensis.* |
| Chickweed | *Stellaria media.* |
| Field camomile | *Anthemis arvensis.* |
| Fat hen | *Chenopodium album.* |
| Cleavers | *Galium aparine.* |
| Barnyard grass | *Echinochloa crus-galli.* |
| Annual meadow-grass | *Poa annua.* |

and the cultivated plant

| | |
|---|---|
| Maize | *Zea mays.* |

were sown in big plastic boxes filled with humous sandy loam, and then covered. On the day of sowing, the surface of the soil was treated with formulations of preparations I, II and III suspended in water. For comparison, various other known urea derivatives, i.e. linuron, metobromuron, buturon and fluometuron, were used. The boxes were placed in a hotbed. The test was evaluated 5 weeks after the treatment.

The following tables indicates the numerical results of the evaluation, the assessment values being calculated in "Damage in percent"; the amounts of active substance used are indicated in g./m.$^2$.

Preparation I=N-(1 - methoxymethylsulfamoylphenyl)-N',N'-dimethyl urea

Preparation II=N-(4 - methoxymethylsulfamoylphenyl)-N'-methyl-N'-methoxy urea

Preparation III=N-(4 - tetramethylenesulfamoylphenyl)-N',N'-dimethyl urea

Preparation IV=N-(3,4-dichlorophenyl) - N'-methyl-N'-methoxy urea (linuron)

Preparation V=N-(4-bromophenyl) - N'-methyl-N'-methoxy urea (metobromuron)

Preparation VI=N-(4-chlorophenyl) - N'-methyl-N'-isobutinyl urea (buturon)

Preparation VII=N-(3-trifluoromethylphenyl)-N',N'-dimethyl urea (fluometuron).

Table 1.—Herbicidal action

For the sake of clearness, an average value, i.e. the "average herbicidal action" was calculated for each concentration of each preparation from the individual values. These values show that with the preparations I and II of the invention 0.12 g./m.$^2$ was sufficient to kill almost all weeds. Of preparation III 0.25 g./m.$^2$ was needed to obtain the same effect. These preparations thus had the same range of action as comparison preparations IV–VII.

In Table 2 the average herbicidal action of each preparation is compared with its action on maize. A comparison of the individual values shows that compounds I–III of the invention well spared the cultivated plant maize while having a good herbicidal action. Contrary thereto, comparison preparations IV–VII which likewise had a good herbicidal action considerably damaged the maize.

loam, and then covered. On the day of sowing, the surface of the soil was treated with formulations of preparations I=N-(3-methyl-4-dimethylsulfamoyl) - phenyl-N',N'-dimethyl urea II=N-(3-chloro-4 - dimethylsulfamoyl)-phenyl-N',N'-dimethyl urea suspended in water. For comparison several other known urea derivatives were used, i.e.

linuron=N-(3,4-dichlorophenyl) - N'-methyl-N'-methoxy urea metobromuron=N - (4 - bromophenyl)-N'-methyl-N'-methoxy urea buturon=N-(4-chlorophenyl)-N'-methyl-N',N'-isobutinyl urea fluometuron=N-(3 - trifluoromethylphenyl) - N',N'-dimethyl urea.

The boxes were placed in a hotbed. The test was evaluated 5 weeks after the treatment. The following tables indicate the result of the evaluation, the assessment values being calculated as "Damage in percent"; the amounts of active substance applied are indicated in g./m.$^2$.

For the sake of clearness, an average value, the

TABLE 1.—HERBICIDAL ACTION

[Damage in percent with g./m.$^2$]

| | Preparation I | | | Preparation II | | | Preparation III | | | Linuron (IV) | | | Metobromuron (V) | | | Buturon (VI) | | | Fluometuron (VII) | | |
|---|---|---|---|---|---|---|---|---|---|---|---|---|---|---|---|---|---|---|---|---|---|
| Plant | 0.06 | 0.12 | 0.25 | 0.06 | 0.12 | 0.25 | 0.12 | 0.25 | 0.50 | 0.06 | 0.12 | 0.25 | 0.12 | 0.25 | 0.50 | 0.12 | 0.25 | 0.50 | 0.12, | 0.25 | 0.50 |
| Wild mustard | 90 | 100 | 100 | 100 | 100 | 100 | 90 | 100 | 100 | 100 | 100 | 100 | 100 | 100 | 100 | 100 | 100 | 100 | 100 | 100 | 100 |
| Chickweed | 100 | 100 | 100 | 100 | 100 | 100 | 100 | 100 | 100 | 100 | 100 | 100 | 100 | 100 | 100 | 100 | 100 | 100 | 100 | 100 | 100 |
| Field camomile | 100 | 100 | 100 | 80 | 100 | 100 | 90 | 100 | 100 | 80 | 100 | 100 | 90 | 100 | 100 | 100 | 100 | 100 | 100 | 100 | 100 |
| Fat hen | 85 | 95 | 100 | 90 | 100 | 100 | 80 | 95 | 100 | 100 | 100 | 100 | 100 | 100 | 100 | 100 | 100 | 100 | 90 | 100 | 100 |
| Cleavers | 50 | 70 | 100 | 60 | 80 | 100 | 50 | 70 | 100 | 30 | 80 | 100 | 40 | 60 | 100 | 60 | 85 | 100 | 45 | 65 | 100 |
| Barnyard grass | 70 | 90 | 100 | 75 | 100 | 100 | 80 | 95 | 100 | 90 | 100 | 100 | 95 | 100 | 100 | 40 | 90 | 100 | 90 | 100 | 100 |
| Annual meadow grass | 85 | 100 | 100 | 85 | 100 | 100 | 90 | 100 | 100 | 80 | 100 | 100 | 100 | 100 | 100 | 100 | 100 | 100 | 100 | 100 | 100 |
| Average herbicidal action | 83 | 94 | 100 | 84 | 97 | 100 | 83 | 94 | 100 | 83 | 97 | 100 | 89 | 95 | 100 | 89 | 97 | 100 | 89 | 95 | 100 |

TABLE 2.—SELECTIVITY

[Damage in percent with g./m.$^2$]

| | Preparation I | | | Preparation II | | | Preparation III | | | Linuron (IV) | | | Metobromuron (V) | | | Buturon (VI) | | | Fluometuron (VII) | | |
|---|---|---|---|---|---|---|---|---|---|---|---|---|---|---|---|---|---|---|---|---|---|
| Plant | 0.06 | 0.12 | 0.25 | 0.06 | 0.12 | 0.25 | 0.12 | 0.25 | 0.50 | 0.06 | 0.12 | 0.25 | 0.12 | 0.25 | 0.50 | 0.12 | 0.25 | 0.50 | 0.12 | 0.25 | 0.50 |
| Weeds | 83 | 94 | 100 | 84 | 97 | 100 | 83 | 94 | 100 | 83 | 97 | 100 | 89 | 95 | 100 | 89 | 97 | 100 | 89 | 95 | 100 |
| Maize | 0 | 10 | 30 | 0 | 0 | 20 | 0 | 20 | 25 | 20 | 30 | 60 | 25 | 60 | 65 | 20 | 45 | 45 | 45 | 45 | 65 |

EXAMPLE 28

The weeds

Wild mustard ............... *Sinapis arvensis.*
Chickweed ............... *Stellaria media.*
Field camomile ............... *Anthemis arvensis.*
Fat hen ............... *Chenopodium album.*
Cleavers ............... *Galium aparine.*
Barnyard grass ............... *Echinochloa crus-galli.*
Annual meadow-grass ............... *Poa annau.* and the cultivated plant

Maize ............... *Zea mays.* were sown in big plastic boxes filled with humous sandy

"average herbicidal action," was calculated for each concentration of each preparation from the individual values. These values show that with substances I and II of the inveniton 0.12 g./m.$^2$ was was sufficient to destroy almost all weeds. These preparations had the same range of action as the indicated comparison preparations.

In the second table of this example the average herbicidal action of the preparations has been compared with the action on maize. The table shows that the compounds of the invention well spared the cultivated plant maize while having a good herbicidal action, whereas the comparison preparations which likewise had a good herbicidal action considerably damaged the maize.

TABLE.—HERBICIDAL ACTION

[Damage in percent with g./m.$^2$]

| | Preparation I | | | Preparation II | | | Linuron | | | Metobromuron | | | Buturon | | | Fluometuron | | |
|---|---|---|---|---|---|---|---|---|---|---|---|---|---|---|---|---|---|---|
| Plant | 0.06 | 0.12 | 0.25 | 0.06 | 0.12 | 0.25 | 0.06 | 0.12 | 0.25 | 0.12 | 0.25 | 0.50 | 0.12 | 0.25 | 0.50 | 0.12 | 0.25 | 0.50 |
| Wild mustard | 90 | 100 | 100 | 55 | 85 | 100 | 100 | 100 | 100 | 100 | 100 | 100 | 100 | 100 | 100 | 100 | 100 | 100 |
| Chickweed | 100 | 100 | 100 | 80 | 100 | 100 | 100 | 100 | 100 | 100 | 100 | 100 | 100 | 100 | 100 | 100 | 100 | 100 |
| Field camomile | 100 | 100 | 100 | 80 | 95 | 100 | 80 | 100 | 100 | 90 | 100 | 100 | 100 | 100 | 100 | 100 | 100 | 100 |
| Fat hen | 80 | 90 | 100 | 90 | 100 | 100 | 100 | 100 | 100 | 100 | 100 | 100 | 100 | 100 | 100 | 90 | 100 | 100 |
| Cleavers | 60 | 90 | 100 | 50 | 80 | 100 | 30 | 80 | 100 | 40 | 60 | 100 | 60 | 85 | 100 | 45 | 65 | 100 |
| Barnyard grass | 50 | 80 | 100 | 45 | 100 | 100 | 90 | 100 | 100 | 95 | 100 | 100 | 40 | 90 | 100 | 90 | 100 | 100 |
| Annual meadowgrass | 85 | 100 | 100 | 60 | 100 | 100 | 80 | 100 | 100 | 100 | 100 | 100 | 100 | 100 | 100 | 100 | 100 | 100 |
| Average herbicidal action | 81 | 96 | 100 | 66 | 95 | 100 | 83 | 97 | 100 | 89 | 95 | 100 | 89 | 97 | 100 | 89 | 95 | 100 |

TABLE.—SELECTIVITY

[Damage in percent with g./m.[2]]

| Plant | Preparation I | | | Preparation II | | | Linuron | | | Metobromuron | | | Buturon | | | Fluometuron | | |
|---|---|---|---|---|---|---|---|---|---|---|---|---|---|---|---|---|---|---|
| | 0.06 | 0.12 | 0.25 | 0.06 | 0.12 | 0.25 | 0.06 | 0.12 | 0.25 | 0.12 | 0.25 | 0.50 | 0.12 | 0.25 | 0.50 | 0.12 | 0.25 | 0.50 |
| Weeds | 81 | 96 | 100 | 66 | 95 | 100 | 83 | 97 | 100 | 89 | 95 | 100 | 89 | 97 | 100 | 89 | 95 | 100 |
| Maize | 0 | 0 | 35 | 0 | 0 | 30 | 20 | 30 | 60 | 25 | 60 | 65 | 20 | 45 | 45 | 45 | 45 | 65 |

EXAMPLE 29

In a manner analogous to that of Example 28, the preparations

I=N-(3-methyl-4-diethylsulfamoylphenyl)-N',N'-dimethyl urea

II=N-(3-methyl-4-tetramethylenesulfamoyl-phenyl)-N',N'-dimethyl urea

III=N-(3-bromo-4-dimethylsulfamoylphenyl)-N',N'-dimethyl urea were tested on the cultivated plants Maize ---------- *Zea mays.*
Sunflower ---------- *Helianthus annuus.*
Pea ---------- *Pisum sativum.* and the last mentioned compound was furthermore tested on

Spring barley ---------- *Hordeum distichum.*
Common cat ---------- *Avena sativa.*
Spring wheat ---------- *Triticum aestivum.*
Rice ---------- *Oryza sativa.*

The following Table 1 shows the herbicidal action of the above substances.

Compounds I, II and III of the invention, used in a concentration of 0.25 g./m$^2$. had such a strong action against the weeds that the effect was substantially equal to a complete destruction of the weeds. Their herbicidal action was therefore in the same range as that of most of the comparison preparations used.

In the following Table 2 the average herbicidal action has been compared with the action on the indicated cultivated plants. It was found that substances I and II of the invention used in a concentration of 0.25 g./m.$^2$ spared the cultivated plants maize, sunflower and pea, while substance III spared barley, common oat, wheat and rice.

TABLE 1.—HERBICIDAL ACTION

[Damage in percent with g./m.[2]]

| Plant | Preparation I | | | Preparation II | | | Preparation III | | |
|---|---|---|---|---|---|---|---|---|---|
| | 0.12 | 0.25 | 0.50 | 0.12 | 0.25 | 0.50 | 0.12 | 0.25 | 0.50 |
| Wild mustard | 60 | 100 | 100 | 100 | 100 | 100 | 60 | 100 | 100 |
| Chickweed | 90 | 100 | 100 | 100 | 100 | 100 | 100 | 100 | 100 |
| Field camomile | 80 | 100 | 100 | 100 | 100 | 100 | 80 | 100 | 100 |
| Fat hen | 50 | 80 | 100 | 95 | 100 | 100 | 60 | 100 | 100 |
| Cleavers | 50 | 80 | 100 | 60 | 95 | 100 | 50 | 80 | 100 |
| Barnyard grass | 40 | 75 | 100 | 50 | 100 | 100 | 60 | 100 | 100 |
| Annual meadow-grass | 100 | 100 | 100 | 100 | 100 | 100 | 80 | 100 | 100 |
| Average herbicidal action | 67 | 91 | 100 | 86 | 99 | 100 | 70 | 97 | 100 |

What is claimed is:

1. A sulfamoylaryl urea of the formula

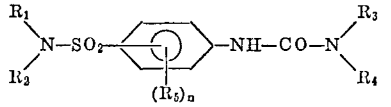

in which $R_1$ is alkyl of 1 to 4 carbon atoms;

$R_2$ is alkyl of 1 to 4 carbon atoms or methoxy; or $R_1$ and $R_2$ together with the nitrogen on which they are substituted are pyrrolidine, piperidine or morpholino;

$R_3$ is methyl or ethyl;

$R_4$ is methyl, ethyl or methoxy;

$R_5$ is methyl, chloro, bromo or dichloro-difluoroethoxy; and

*n* is 0, 1 or 2, *n* being at least 1 when $R_1$, $R_2$, $R_3$ and $R_4$ are all methyl.

2. A sulfamoyl urea of the formula

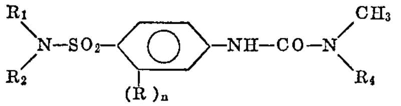

in which $R_1$ is methyl or ethyl;

$R_2$ is methyl, ethyl or methoxy;

$R_4$ is methyl or methoxy;

$R_5$ is methyl, chloro or bromo; and

*n* is zero or 1, *n* being 1 when $R_1$, $R_2$ and $R_4$ are all methyl.

3. A compound having the formula

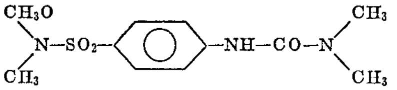

4. A compound having the formula

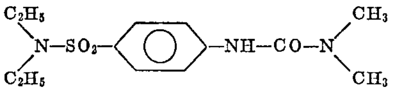

5. A compound having the formula

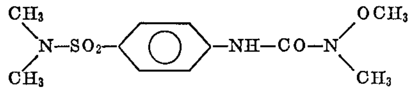

TABLE 2.—SELECTIVITY

[Damage in percent with g./m.[2]]

| Plant | Preparation I | | | Preparation II | | | Preparation III | | | Linuron (IV) | | | Metobromuron (V) | | | Buturon (VI) (VI) | | | Fluometuron (VII) | | |
|---|---|---|---|---|---|---|---|---|---|---|---|---|---|---|---|---|---|---|---|---|---|
| | 0.12 | 0.25 | 0.50 | 0.12 | 0.25 | 0.50 | 0.12 | 0.25 | 0.50 | 0.06 | 0.12 | 0.25 | 0.12 | 0.25 | 0.50 | 0.12 | 0.25 | 0.50 | 0.12 | 0.25 | 0.50 |
| Herbicid al action | 67 | 91 | 100 | 86 | 99 | 100 | 70 | 97 | 100 | 83 | 97 | 100 | 89 | 95 | 100 | 89 | 97 | 100 | 89 | 95 | 100 |
| Maize | 0 | 0 | 20 | 0 | 0 | 20 | 0 | 0 | 0 | 20 | 30 | 60 | 25 | 60 | 65 | 20 | 45 | 45 | 45 | 45 | 60 |
| Sunflower | 0 | 0 | 40 | 0 | 20 | 50 | 0 | 10 | 30 | 20 | 70 | 100 | 60 | 80 | 100 | 60 | 100 | 100 | 60 | 85 | 100 |
| Pea | 0 | 0 | 30 | 0 | 0 | 0 | 0 | 0 | 20 | 20 | 60 | 80 | 20 | 50 | 100 | 30 | 50 | 100 | 30 | 60 | 65 |
| Barle y | | | | | | | 0 | 0 | 20 | 20 | 40 | 70 | 60 | 100 | 100 | 65 | 85 | 100 | 85 | 95 | 100 |
| Com mon oat | | | | | | | 0 | 0 | 0 | 25 | 75 | 100 | 85 | 100 | 100 | 80 | 100 | 100 | 100 | 100 | 100 |
| Whe at | | | | | | | 0 | 0 | 20 | 20 | 75 | 95 | 60 | 100 | 100 | 80 | 100 | 100 | 95 | 100 | 100 |
| Ric e | | | | | | | 0 | 0 | 30 | 35 | 55 | 60 | 40 | 60 | 60 | 45 | 65 | 75 | 50 | 70 | 70 |

6. A compound having the formula
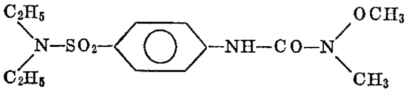
7. A compound having the formula
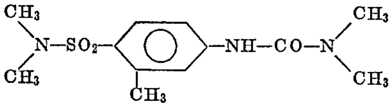
References Cited
FOREIGN PATENTS
6611708 3/1967 Netherlands ------- 260—3977
HENRY R. JILES, Primary Examiner
C. M. SHURKO, Assistant Examiner
U.S. Cl. X.R.
71—88, 94, 95, 103; 260—247.1, 293.73, 326.3, 518 R, 518 A, 519, 453 R, 543 R, 553 A, 239.6, 239.7, 239.8